United States Patent [19]
Tschurbanoff et al.

[11] Patent Number: 6,119,837
[45] Date of Patent: Sep. 19, 2000

[54] METHOD AND ARRANGEMENT FOR CONTROLLING CABLE WINDING AND UNWINDING IN AN ELECTRICALLY DRIVEN VEHICLE

[75] Inventors: Aleksei Tschurbanoff, Turku; Jukka Lehtonen, Loimaa, both of Finland

[73] Assignee: Tamrock Oy, Tampere, Finland

[21] Appl. No.: 09/101,666

[22] PCT Filed: Feb. 3, 1997

[86] PCT No.: PCT/FI97/00056

§ 371 Date: Jul. 15, 1998

§ 102(e) Date: Jul. 15, 1998

[87] PCT Pub. No.: WO97/28592

PCT Pub. Date: Aug. 7, 1997

[30] Foreign Application Priority Data

Feb. 2, 1996 [FI] Finland ................................. 960499

[51] Int. Cl.⁷ ................................................ H02G 11/00
[52] U.S. Cl. ............................................... 191/12.2 A
[58] Field of Search ............................ 191/12 R, 122 R, 191/12.2 A; 104/178, 179, 183; 242/410, 412, 412.1, 412.2, 414, 414.1

[56] References Cited

U.S. PATENT DOCUMENTS

| | | |
|---|---|---|
| 1,827,380 | 10/1931 | Boggs ................................. 191/12.2 R |
| 3,250,492 | 5/1966 | Hlinsky et al. . |
| 3,863,741 | 2/1975 | Mitsuishi et al. . |
| 3,943,306 | 3/1976 | Aihara et al. ....................... 191/12.2 R |
| 4,047,599 | 9/1977 | Rousseau ............................ 191/12.2 A |
| 4,114,827 | 9/1978 | Maier . |
| 4,258,834 | 3/1981 | Hawley et al. ..................... 191/12.2 R |
| 4,569,489 | 2/1986 | Frey et al. . |
| 4,583,700 | 4/1986 | Tschurbanoff . |
| 4,587,383 | 5/1986 | Stoldt .................................... 191/12 R |
| 4,722,494 | 2/1988 | Fairchild ............................ 191/12.2 R |
| 5,007,599 | 4/1991 | Forsyth . |

*Primary Examiner*—Mark T. Le
*Attorney, Agent, or Firm*—Nixon & Vanderhye P.C.

[57] ABSTRACT

A method and an arrangement for controlling cable winding and unwinding in an electrically driven vehicle. In the method, cable winding and unwinding, respectively, are controlled on the basis of the position of driving and/or steering means of the vehicle. The arrangement comprises only one unwinding valve connected in series with a hydraulic motor, by which valve the counterpressure of the hydraulic fluid flowing through the hydraulic motor can be regulated during cable unwinding from the reel, and one unwinding valve respectively, by which the quantity of the hydraulic fluid coming to the hydraulic motor can be regulated during cable winding.

11 Claims, 2 Drawing Sheets

METHOD AND ARRANGEMENT FOR CONTROLLING CABLE WINDING AND UNWINDING IN AN ELECTRICALLY DRIVEN VEHICLE

BACKGROUND AND SUMMARY OF THE INVENTION

The invention relates to a method for controlling cable winding and unwinding in an electrically driven vehicle, in which method a cable is wound by rotating a cable reel by means of a hydraulic motor coupled thereto, and the cable is unwound from the reel in a braked condition by using the hydraulic motor as a hydraulic pump, such that winding and unwinding, respectively, take place in the direction of motion of the vehicle.

Further, the invention relates to an arrangement for cable winding and unwinding in an electrically driven vehicle, the arrangement comprising a cable reel, a hydraulic motor for rotating the cable reel during cable winding and for braking its rotation during cable unwinding, a hydraulic pump for feeding hydraulic fluid and control valves for controlling the feed of hydraulic fluid to the hydraulic motor during winding and for throttling the flow of hydraulic fluid during cable unwinding.

In electrically driven vehicles, such as mine loaders etc., winding and unwinding a cable extending from a reel to a power source are currently regulated either by measuring cable tension, or on the basis of cable reel movements, by means of mechanical information. A problem with this technique is that when trying to control cable winding or unwinding by means of cable tension, the control system is always late, because it does not react until the cable has tightened or slackened. Moreover, turning at bends, for instance, results in that the cable is dragged along the floor, since the system does not wind or unwind cable because a transverse movement does not tighten or slacken the cable in the same way as driving straight forward. Slow control also leads to a situation where the cable may be subjected to unexpected, sudden and too strong strains, which may break or damage the cable. Another problem with the known technique is that hydraulic control and feed systems are complicated, easily damaged and also expensive.

An object of this invention is to provide a method and an arrangement for cable winding on, and unwinding from, a reel in an electrically driven vehicle, by which method and arrangement drawbacks of the known solutions are avoided and cable winding and unwinding can be controlled as well as possible. A particular object of this invention is to eliminate the variations in cable tension caused by the large mass of the cable reel and its variation when the vehicle is accelerated or braked, to keep the cable tension as even as possible in spite of great variation in the cable reel, and to increase the service life of the cable from some hundreds of hours even up to some thousands of hours.

The method of the invention is characterized in that cable winding and unwinding, respectively, are controlled on the basis of the position of driving and/or steering means of the vehicle.

The arrangement of the invention is further characterized in that it comprises only one unwinding valve connected in series with the hydraulic motor, by which valve the counterpressure of the hydraulic fluid flowing through the hydraulic motor and thus the rotational resistance of the hydraulic motor can be regulated during cable unwinding from the reel, and one winding valve, respectively, by which the quantity of hydraulic fluid coming to the hydraulic motor can be regulated during cable winding. The arrangement also comprises control means connected to control the unwinding valve and the winding valve during cable unwinding and winding, respectively, and that at least part of the driving and steering means of the vehicle are connected to control the control means.

The essential idea of the invention is that cable winding on a reel or unwinding from the reel is controlled on the basis of the operation of the driving and steering means of the vehicle and by measuring the cable quantity on the cable reel, whereby a programmable logic can attend to the cable winding and unwinding on the basis of the properties of the vehicle, preferably by means of a table stored in the memory of the control logic. Then the cable winding and unwinding can be arranged in such a way that the cable is wound or unwound at the same speed as the vehicle moves including when it is accelerated and braked. This prevents the cable from being strained unnecessarily in any driving situation and eliminates at the same time the dragging of the cable when the vehicle is turning.

The invention will be described in greater detail in the attached drawings.

DETAILED DESCRIPTION OF THE DRAWINGS

Figure 1:
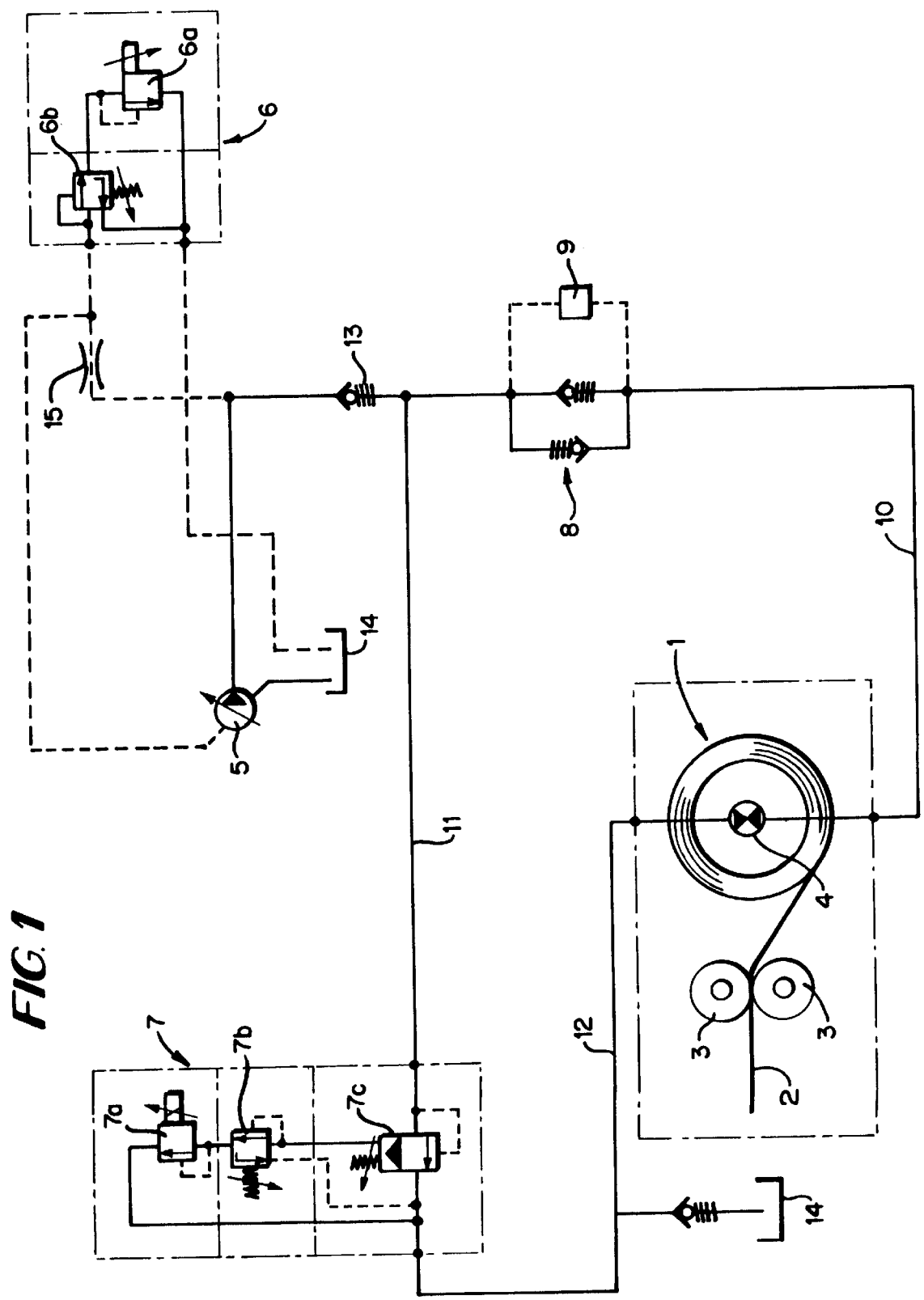
FIG. 1 shows an operating system of cable winding apparatus according to the invention schematically and FIG. 2 shows schematically how the system of FIG. 1 is coupled to driving means of a vehicle in a manner according to the invention.

FIG. 1 shows a cable reel 1 having cable 2 wound on it. The cable 2 is wound on the reel and unwound from the reel between separate guide rollers 3. The cable reel 1 is rotated, or its rotation is braked, by means of a hydraulic motor 4. There is further a hydraulic pump 5, which is a pressure-controlled volume flow pump. For the control of the pump during winding, there is a winding valve 6 regulating the pressure of a control channel of the hydraulic pump 5 and thus the quantity of hydraulic fluid delivered by the pump according to the driving situation of the vehicle controlled by a separate control logic. Moreover, FIG. 1 shows an unwinding valve 7 regulating the counterpressure during cable unwinding in such a way that the tension of the cable remains as desired according to the circumstances and the driving situation of the vehicle. FIG. 1 also shows double non-return valves 8, over which is mounted a pressure difference switch 9 sensing the pressure. During cable unwinding, the coupling according to FIG. 1 operates in such a way that the hydraulic motor 4 of the cable reel 1 serves as a braking hydraulic pump connected to a closed hydraulic loop. From the hydraulic motor 4 the hydraulic fluid flows through a channel 10 to the double non-return valve 8 and through a channel 11 further to the unwinding valve 7, the pressure value of which is regulated on the basis of the driving situation of the vehicle. The unwinding valve 7 comprises three sectors 7a to 7c, sector 7a being a regulating sector controlled by a logic and additionally comprising maximum and minimum pressure regulators 7b and 7c implemented by springs. The minimum pressure regulator 7c insures that the winding functions in fault situations, whereby the machine can be stopped in case of an electrical fault before the cable is damaged. On the other hand, the maximum pressure setting insures that the system will not be subjected to an excessive pressure for any reason. In order to prevent the cable from being unwound in an uncontrolled manner, the pressure acting over the unwinding valve 7 shall always be higher than zero. From the unwinding valve 7 the hydraulic fluid flows further through a channel 12 back to the hydraulic motor 4. The pressure of the unwinding valve 7 is regulated according to the vehicle speed by utilizing the position of its gear selector and the position of its driving clutch. If the vehicle is braked, the pressure of the unwinding valve 7 rises so high that the speed of rotation of the cable reel is retarded correspondingly and the cable cannot be unwound freely. The double non-return valve 8 and the pressure difference switch 9 serve as safety devices, which prevent faulty operation when the vehicle steering is in contradiction with its real direction of movement. In situations when the vehicle tries to drive forward, indicators connected to the control system show that the cable should be unwound from the reel. If in this situation, a hill sloping backwards makes the vehicle slide backwards down the hill, this appears as a pressure over the double non-return valves, which pressure is indicated by the pressure difference switch 9. This signal overrides all other control signals and connects the cable reel to wind cable in order to prevent it from getting run over by the wheels of the vehicle. The winding valve 6 comprises a regulating sector 6a controlled by a logic and a minimum pressure regulator 6b regulated by means of a spring. The minimum pressure regulator 6b regulates the minimum valve of the pressure delivered by the pump, this valve being 60 bar in the example case. The hydraulic flow of the pump 5 is pressure-controlled, the flow rate depending on the driving situation. When the vehicle does not move, i.e. the reel 1 does not rotate, the pump flow is set to zero. During cable 2 unwinding from the reel 1, the regulating sector 6a is not controlled, due to which the pump pressure is always 60 bar controlled by the regulator 6b. Since the pressure over the motor 4 of the reel 1 always exceeds 60 bar during cable unwinding, the pump is always set to zero delivery and no hydraulic flow takes place through the pump. To insure this function, the coupling additionally comprises a non-return valve 13 located between the hydraulic pump 5 and the channel 11. The control channel of the hydraulic pump 5 is connected to the pressure channel of the winding valve 6 and they both are connected to the pressure channel of the hydraulic pump 5 via a throttle 15.

During cable winding, i.e. when the vehicle is driven towards unwound cable, the hydraulic pump 5 is controlled according to the steering and driving means of the vehicle, correspondingly. Then the pressure valve of the winding valve 6 is regulated in such a way that the hydraulic pump 5 feeds hydraulic fluid through the non-return valve 13 and further through the channel 10 to the hydraulic motor 4. From the hydraulic motor 4 the hydraulic fluid flows into a hydraulic fluid container 14. During winding, the pressure setting of the unwinding valve 7 is regulated to such a value that no hydraulic fluid can flow through it in normal circumstances. During acceleration, the delivery and the pressure of the hydraulic pump are increased so as to make it possible to adapt the speed of rotation of the cable reel 1 to the cable quantity to be wound thereon. Since the length of one turn of wound cable changes according to the amount of cable wound of the cable reel, the control also includes sensors showing the cable quantity on the cable reel, the function and operation of which sensors will be described more accurately in connection with FIG. 2. By means of such sensors, it is possible to control the speed of rotation of the cable reel according to the needs of the moment, on one hand, and to stop the vehicle at the moment when the cable is fully unwound, before the cable is subjected to excessive forces, on the other hand.

Figure 2:
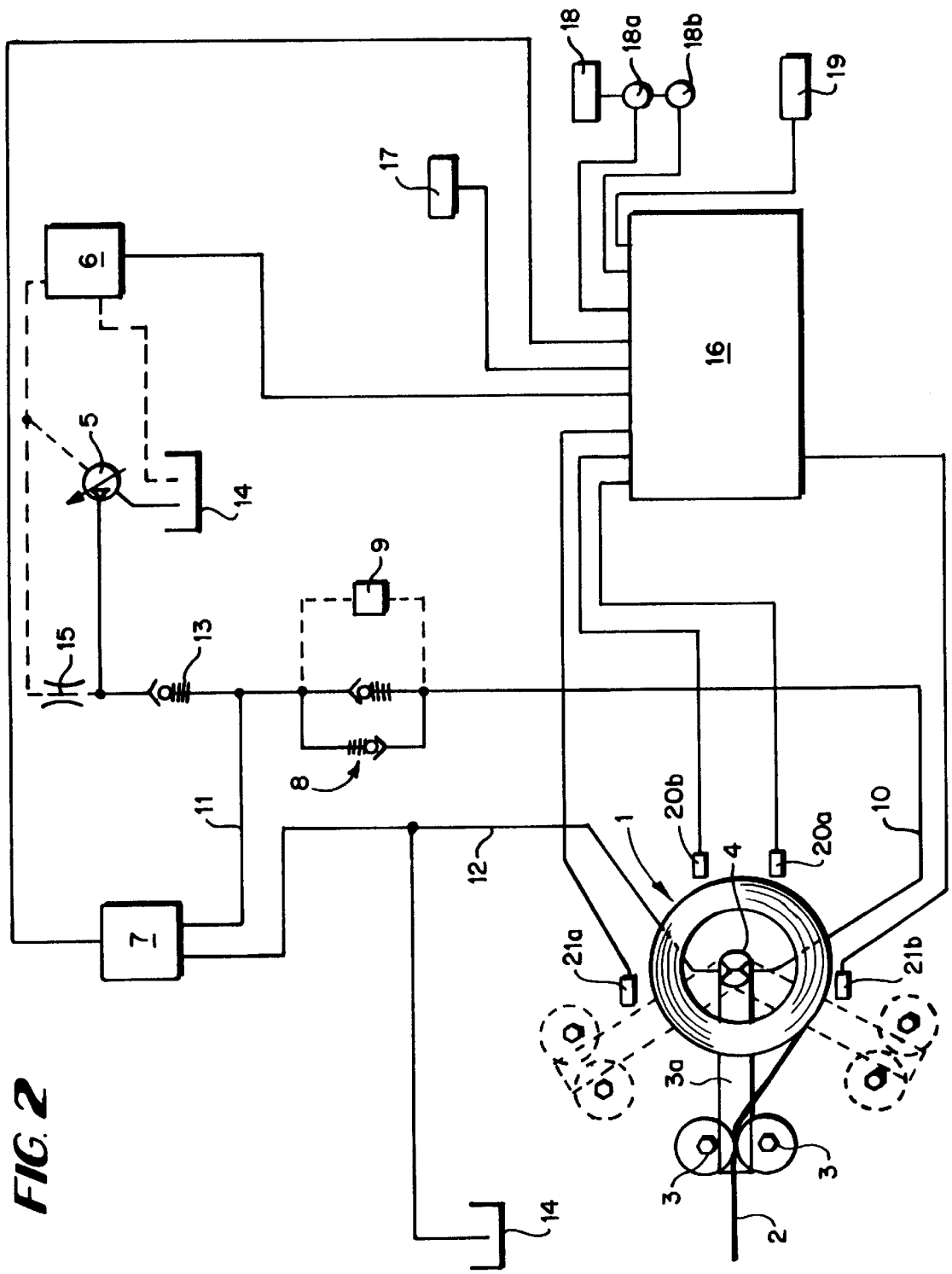

FIG. 2 shows the structure of the hydraulic fluid coupling shown in FIG. 1 and the electric control related thereto in more detail. FIG. 2 uses the same references numbers for corresponding parts shown in FIG. 1.

FIG. 2 shows how the guide rollers 3 of the cable are connected to a separate control are 3a, which can turn with respect to the rotation axis of the cable reel 1. The turning of the control are 3a can be observed and taken into consideration during cable unwinding and winding. FIG. 2 shows a control unit 16 belonging to the control means, which unit receives a control signal from a gear selector 17, a brake pedal 18 and a driving clutch 19. The driving clutch 19 is usually of pedal type and it is used when starting and also when changing the driving direction or the range of speed. This clutch functions in such a way that it may allow part of the tractive power of the machine to slip, and then it closes automatically and transfers the whole tractive power to the shafts. Generally, the driving motor of a vehicle rotates at constant speed, due to which the acceleration and the driving speed depend on the gear selected. The driving clutch only shows whether the drive is on or not. Thanks to this structure, different driving speeds and driving situations are easy to tabulate so that signals produces by various regulators and controllers can be combined to a predetermined operating value for the control of cable winding. It is then possible to use several different tables comprising the necessary pressure values calculated for each driving situation to overcome the inertial forces of the cable reel. Facts to be considered here are cable reel diameter, i.e. reel mass, depending thereon, acceleration with the gear selected, control arm position, brake pressure, driving clutch position, signals produced by different safety devices and cable quantity on the reel. To the control unit 16 is also connected the pressure difference switch 9 indicating the pressure over the double non-return valve 8 and, on the basis of that, the direction of cable winding. The brake pedal 18 gives its pressure value either directly or pressure limit detectors 18a and 18b are used according to FIG. 2, the pressure limits detected by them differing from each other. Further, to the control unit 16 are connected sensors 20 detecting cable quantity and sensors 21a and 21b detecting the extreme positions of the control arm 3a. The control unit 16 follows up signals from these continuously and controls on the basis of these signals the electrically controlled winding valve 6 and unwinding valve 7, respectively.

When the vehicle is accelerated by pressing the driving clutch 19, the control unit 16 notices it and controls on the basis of that by means of the winding valve 6, the control pressure and thus the delivery of the hydraulic pump 5 is bigger during cable winding, due to which the speed of rotation of the cable reel 1 accelerates at the same rate as that of the vehicle. As a result the cable cannot get run over by the vehicle, but stays at suitable tension and is wound according to the speed of the vehicle. During braking, the control pressure of the control valve 6 and thus the pressure fluid delivery of the hydraulic pump 5 are lowered, due to which the winding gets slower, correspondingly. During cable unwinding from the reel, pressing the driving clutch 9 produces in the control unit 16 a control signal diminishing the pressure of the unwinding valve 7 and thus allowing cable to be unwound from the reel more easily. During unwinding, the delivery of the hydraulic pump 5 is controlled to be zero, of course, and the pump is, in practice, disconnected from the circuit of the hydraulic motor 4 of the cable reel 1. During braking, it provides the control unit with a signal which is different depending on whether the braking is carried out by a stronger or a weaker force. According to whether the braking force is detected by the pressure limit detector 18a or 18b, the control unit 16 then controls the pressure value of the unwinding valve 7 more or less higher than the momentary pressure value, and thus retards the rotation of the cable reel 1 and prevents the cable from being unwound freely.

When the transmission speed of the gearing is changed by the gear selector 17 of the vehicle, the control unit 16 takes this into account and controls the pressure setting of either the winding valve 6 or the unwinding valve 7 to correspond to the variable driving speed.

Thus, in accordance with this invention, cable winding and unwinding can be regulated in such a way that, in case if the position of some driving means of the vehicle changes, the control unit 16 essentially immediately anticipates the behaviour of the vehicle and controls the cable reel 1 without the tension of the cable 2 having time to change substantially. In this way, dragging and breaking the cable, and/or the cable getting run over by the vehicle are prevented and avoided, because an excessive abrupt tensioning and a slackening of the cable under the vehicle are prevented. A turning of the vehicle can be taken into consideration both during cable unwinding and winding by means of sensors 21a and 21b indicating the position of the control arm 3a. In the embodiment shown, these sensors only indicate the extreme positions of the control arm 3a. However if desired, the turning angles of the control arm between the extreme positions and a position pointing directly to the vehicle direction also be considered by suitable sensing. When the cable is nearly put from the reel, the sensors 20a and 20b detect the substantially fully unwound situation. Then the sensors 20a and 20b show by a sound or light signal, for instance, the fact that there is practically no cable on the cable reel 1. In the same way, the sensors 20a and 20b cause the control unit 16 to stop the vehicle engine and to put on the parking brakes automatically shortly before the cable has been unwound from the reel entirely. This prevents the driver from breaking the cable by accident. When the sensors 20a and 20b serve as a revolution counter, the momentary length of the cable 2 on the reel 1 and also the corresponding cable reel mass are known in all driving situations. The sensors 20a and 20b are mounted on the vehicle body in such a way that they also observe the direction of rotation of the reel 1, which property can be used as a safety measure. The anticipated direction of rotation is obtained from the position of the gear selector 17 and the control arm 3a.

In the description and drawings above, the invention is described only by way of example and it is by no means restricted to that single example. The operation of the control unit and the coupling of various driving means of the vehicle to the control unit can be carried out in different ways. For example, it is possible to take the braking pressure directly from the brake pedal or, as shown in FIG. 2, predetermined pressure values can be obtained by means of limit switches. Similarly, the number of turns on the cable reel can be measured by counting the number of turns and by correcting the cable unwinding and winding, respectively, according to the average diameter of the cable turn in question. The turning angle of the control arm 3a can be indicated either as a direct turning angle or in suitable steps between the extreme positions. In vehicles where a normal gas pedal is used for regulating the driving speed of the vehicle, it is in turn possible to take into account the position of the gas pedal, which position can be measured in various manners depending on the desired accuracy. Even if this makes the use of tabulation more difficult at the control, it nevertheless can be realized.

What is claimed is:

1. A method for controlling winding and unwinding of a cable in an electrically driven vehicle, in which method a cable is wound by rotating a cable reel in a first direction by means of a hydraulic motor coupled thereto, and unwound from the reel by rotating the cable reel in an opposite direction in a braked condition by using the hydraulic motor as a hydraulic pump, the method comprising:

winding and unwinding the cable as a function of a direction of motion of the vehicle;

controlling the winding and unwinding, respectively, of the cable as a function of a position of driving and/or steering means of the vehicle, and during winding of the cable, feeding the hydraulic motor with hydraulic fluid from a source of hydraulic fluid, with volume flow of the hydraulic fluid being regulated as a function of the position of said driving and/or steering means of the vehicle.

2. The method according to claim 1, wherein during unwinding of the cable, the hydraulic motor is coupled so as to be part of a closed loop comprising an unwinding valve limiting the flow of the hydraulic fluid, whereby a throttling of the flow of hydraulic fluid caused by the unwinding valve is regulated as a function of the position of said driving and/or steering means of the vehicle.

3. Apparatus for unwinding and winding a cable in an electrically driven vehicle, the apparatus comprising a cable reel; a hydraulic motor for rotating the cable reel during winding of the cable and for braking rotation of the cable reel during unwinding of the cable; a hydraulic pump for feeding hydraulic fluid at a feed pressure to the hydraulic motor; and a plurality of control valves for controlling the feed of hydraulic fluid to the hydraulic motor during winding of the cable and for throttling the flow of hydraulic fluid during unwinding of the cable; an unwinding valve connected in series with the hydraulic motor, said unwinding valve arranged to regulate counterpressure of the hydraulic fluid flowing through the hydraulic motor and rotational resistance of the hydraulic motor during unwinding of the cable from the reel; a winding valve arranged to regulate the quantity of hydraulic fluid coming to the hydraulic motor during winding of the cable; and control means for controlling the unwinding valve and the winding valve during unwinding and winding of the cable, respectively, and wherein driving and steering components of the vehicle are connected to said control means.

4. Apparatus according to claim 3, wherein the unwinding valve and the hydraulic motor are connected in series with each other, forming a loop for the flow of hydraulic fluid; and further wherein the unwinding valve is controlled to a pressure value higher than the feed pressure of the hydraulic pump during winding of the cable.

5. Apparatus according to claim 4 wherein the hydraulic pump is a pressure-controlled hydraulic pump and the winding valve is connected to control the hydraulic pump according to signals produced by the control means; and wherein a channel for hydraulic fluid coming from the hydraulic pump is connected to said loop by means of a non-return valve preventing the hydraulic fluid from flowing from said loop towards the hydraulic pump during unwinding of the cable.

6. Apparatus according to claim 4 wherein said loop is connected to two non-return valves mounted in opposite directions; and further wherein a pressure difference sensor is connected over said two non-return valves, the sensor indicating a pressure difference of the hydraulic fluid over said two non-return valves and a flow direction of the hydraulic fluid; and further wherein the pressure difference sensor is connected to control the control means.

7. Apparatus according to claim 3 wherein said control means is connected to a gear selector, from which a signal indicating a gear in use is connected to control unwinding or winding of the cable through said control means.

8. Apparatus according to claim 3 wherein braking means are connected to control said control means, said braking means producing signals by which said control means control unwinding or winding of the cable.

9. Apparatus according to claim 8, wherein the braking means are provided with two braking force detectors indicating braking force and enabling controlling of said control means during unwinding and winding of the cable, respectively.

10. Apparatus according to claim 3 and further comprising sensors for detecting a turning angle of a control arm of the cable and controlling the control means on the basis of the turning angle of the control arm, whereby the control means are connected to control unwinding or winding of the cable as a function of the signals produced by said sensors.

11. Apparatus according to claim 3 and further comprising at least one sensor detecting cable quantity on the cable reel and connected to control the control means in such a way that when the cable reel is nearly out of cable, the control means stops the vehicle at a predetermined place.

* * * * *